United States Patent
Syed et al.

(10) Patent No.: US 8,914,216 B2
(45) Date of Patent: Dec. 16, 2014

(54) ENGINE POWER QUANTIZATION FUNCTION SELECTION

(71) Applicant: Ford Global Technologies, LLC, Dearborn, MI (US)

(72) Inventors: Fazal Urrahman Syed, Canton, MI (US); Qing Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 13/870,075

(22) Filed: Apr. 25, 2013

(65) Prior Publication Data

US 2013/0238179 A1 Sep. 12, 2013

Related U.S. Application Data

(63) Continuation-in-part of application No. 13/007,700, filed on Jan. 17, 2011, now Pat. No. 8,442,711.

(51) Int. Cl.
| | | |
|---|---|---|
| G06F 19/00 | (2011.01) |
| B60W 20/00 | (2006.01) |
| B60K 6/24 | (2007.10) |
| B60K 6/445 | (2007.10) |
| B60W 10/06 | (2006.01) |
| B60W 10/08 | (2006.01) |
| B60W 30/20 | (2006.01) |

(52) U.S. Cl.
CPC .............. *B60W 20/00* (2013.01); *Y10S 903/903* (2013.01); *B60W 20/108* (2013.01); *B60K 6/24* (2013.01); *B60K 6/445* (2013.01); *B60W 10/06* (2013.01); *B60W 10/08* (2013.01); *B60W 30/20* (2013.01); *Y02T 10/6286* (2013.01); *B60W 2030/206* (2013.01); *B60W 2530/14* (2013.01); *B60W 2540/10* (2013.01); *B60W 2710/0677* (2013.01); *Y02T 10/6239* (2013.01)

USPC .......... 701/101; 701/22; 180/65.28; 903/903

(58) Field of Classification Search
CPC ..... B60W 20/00; B60W 10/06; B60W 10/08; B60K 6/445; Y02T 10/6286
USPC ........ 701/22, 99, 101, 110; 180/65.21, 65.28, 180/65.285
See application file for complete search history.

(56) References Cited

U.S. PATENT DOCUMENTS

| | | |
|---|---|---|
| 5,820,172 A | 10/1998 | Brigham et al. |
| 6,367,570 B1 | 4/2002 | Long, III et al. |

(Continued)

OTHER PUBLICATIONS

Clark G. Hochgra, et al., SAE International Technical Papers, Engine Control Strategy for a Series Hybrid Electric Vehicle Incorporating Load-Leveling and Computer Controlled Energy Management, Published Feb. 1, 1996.

(Continued)

*Primary Examiner* — Thomas Tarcza
*Assistant Examiner* — Kevin Myhre
(74) *Attorney, Agent, or Firm* — David B. Kelley; Brooks Kushman P.C.

(57) ABSTRACT

A vehicle having and engine and traction battery and a method of operating an engine are disclosed. A controller operates the engine according to quantized engine power levels. The quantization level depends upon a total power demand. For low values of total power demand, the selected quantization level may be at least equal to the total power demand. For high values of total power demand, the selected quantization level may be less than or equal to the total power demand. In between low and high values, the selected quantization level may be the quantization level nearest the total power demand. The traction battery may receive or provide power depending on the selected quantization level.

10 Claims, 5 Drawing Sheets

(56) References Cited

U.S. PATENT DOCUMENTS

| | | |
|---|---|---|
| 7,206,687 B1 | 4/2007 | Huseman |
| 2009/0157244 A1 | 6/2009 | Kim |
| 2009/0259355 A1 | 10/2009 | Li |
| 2010/0017054 A1 | 1/2010 | Okubo et al. |
| 2010/0152936 A1 | 6/2010 | Wang et al. |

OTHER PUBLICATIONS

Fazal U. Syed, et al., Fuzzy Gain-Scheduling Proportional-Integral Control for Improving Engine Power and Speed Behavior in a Hybrid Electric Vehicle, IEEE Transactions on Vehicular Technology, vol. 58, No. 1, Jan. 2009.

ENGINE POWER QUANTIZATION FUNCTION SELECTION

CROSS-REFERENCE TO RELATED APPLICATIONS

This application is a continuation-in-part of application Ser. No. 13/007,700, filed Jan. 17, 2011, the disclosure of which is incorporated in its entirety by reference herein.

TECHNICAL FIELD

The present invention relates to a hybrid vehicle and a method of control.

BACKGROUND

FIG. 1 illustrates a block diagram of a conventional 'load-following' engine power determination architecture 10 for a hybrid electric vehicle. In the conventional architecture 10, an engine power command 12 is determined as the sum of a driver power command 14 and a battery power command 16. As such, in the conventional architecture 10, the engine directly responds to any change of the driver power command 14.

Accordingly, in real-world driving, any chaotic and aggressive driver power command 14 can easily generate a perturbation of the engine power command 12. The perturbation can be reflected as fast-fluctuations and dithering in the engine power command 12. Such transients may adversely affect the engine combustion efficiency and cost extra transient fuel. Further, many engine control parameters are 'predicatively' scheduled based on the rate of change of engine power command 12. Therefore, engine power disturbances may cause other non-optimum engine settings and worsen fuel/air errors. Even if the A/F ratio can be kept within a moderate narrow range, the integration effect of the fuel enrichments caused by more frequently occurring transients can be magnified and accumulated up to a considerable level of fuel losses.

SUMMARY

A vehicle is disclosed that is comprised of an engine, a traction battery and at least one controller. The controller is programmed to request power from the engine at least equal to the total power demand when the total power demand is less than a predetermined value such that the traction battery receives power. The controller is programmed to request power from the engine less than the total power demand when the total power demand is greater than another predetermined value such that the traction battery provides power to satisfy the total power demand. The controller may be further programmed to request power from the engine at quantized levels so that the traction battery receives or provides power according to the difference between the total power demand and the quantized requested power level. The total power demand may be the sum of a driver power demand and a battery power demand. The controller may be further programmed to request power from the engine at a selected one of the quantized levels closest in value to the total power demand. The vehicle may be further programmed to request power from the engine at one of the quantized levels closest in value to the total power demand when the total power demand is greater than the predetermined value and less than the another predetermined value.

A vehicle is disclosed that is comprised of an engine, a traction battery, and at least one controller. The controller is programmed to request power from the engine at quantized levels less than or equal to total power demand such that the traction battery provides power to satisfy the total power demand. The total power demand may be the sum of driver power demand and battery power demand. The controller may be further programmed to request power from the engine at quantized levels at least equal to the total power demand when the total power demand is less than a predetermined value such that the traction battery receives power from the engine. The controller may be further programmed to request power from the engine at a selected one of the quantized levels closest in value to the total power demand when the total power demand is greater than a predetermined value and less than another predetermined value.

A method for operating an engine is disclosed. The method comprises outputting power from the engine at least equal to a total power demand when the total power demand is less than a predetermined value. The method further comprises outputting power from the engine less than the total power demand when the total power demand is greater than another predetermined value. The method further comprises requesting power from the engine at a selected one of a plurality of quantized levels closest in value to the total power demand when the total power demand is greater than the predetermined value and less than the another predetermined value. The method may further comprise the total power demand being the sum of driver power demand and battery power demand. The method may further comprise requesting power from the engine at one of the quantized levels closest in value to the total power demand when the total power is less than the predetermined value or greater than the another predetermined value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
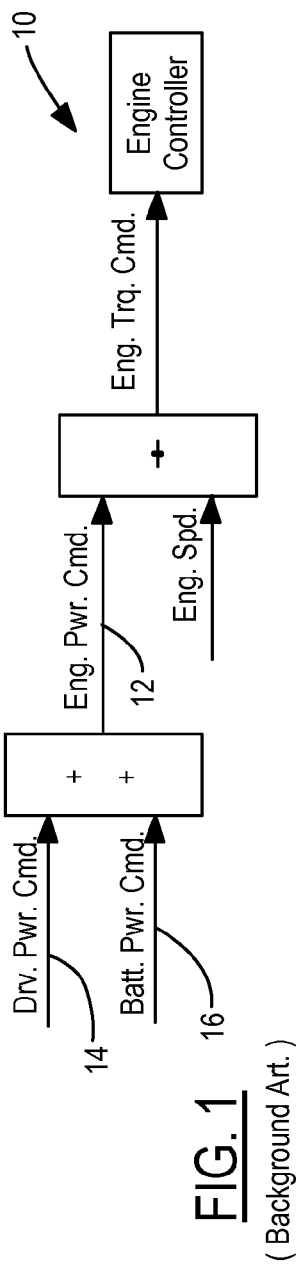
FIG. 1 illustrates a block diagram of a conventional 'load-following' engine power determination architecture for a hybrid electric vehicle.
Figure 2:
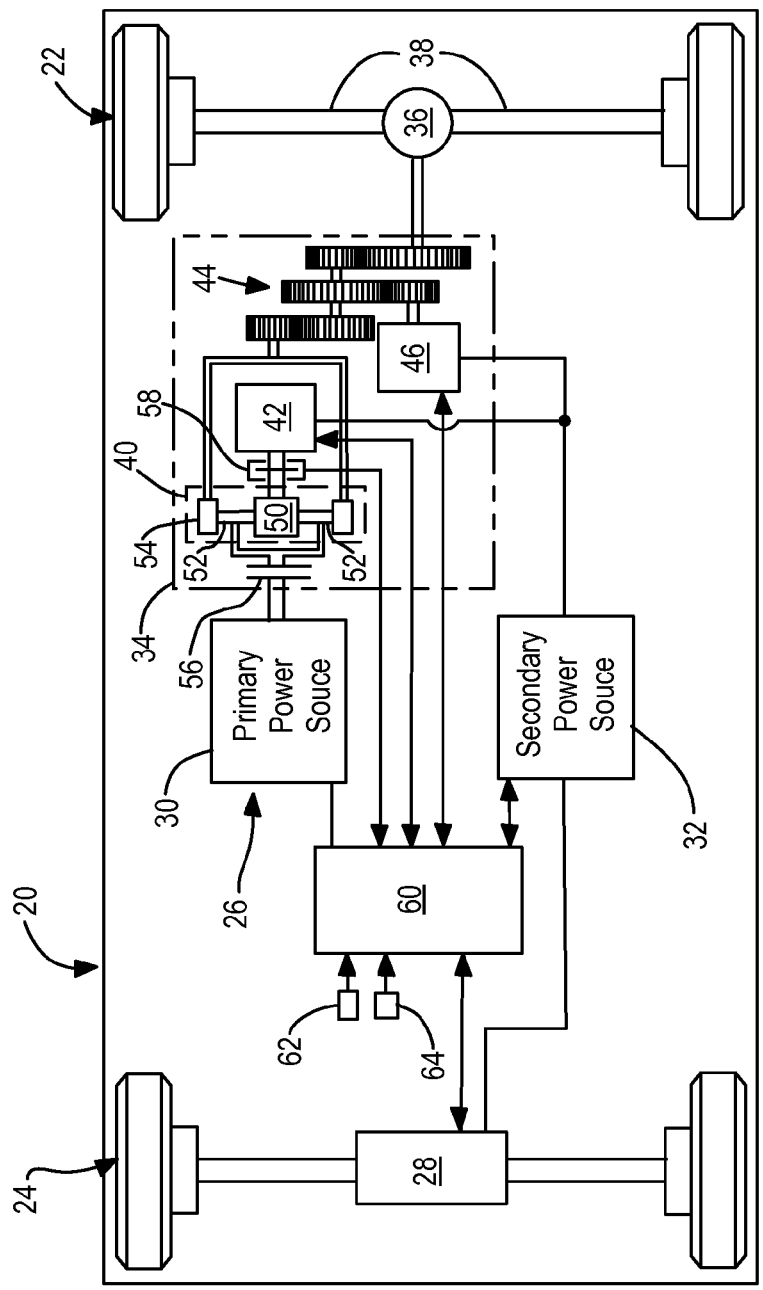
FIG. 2 illustrates a schematic of an exemplary hybrid vehicle.

FIG. 2 illustrates a schematic of one possible embodiment of a hybrid vehicle 20. The hybrid vehicle 20 includes a first wheel set 22, a second wheel set 24, and a wheel drive system or drivetrain 26.

The drivetrain 26 may be configured to drive or actuate the first and/or second wheel sets 22, 24. The drivetrain 26 may have any suitable configuration, such as a series drive, split hybrid drive, or dual mode split as is known by those skilled in the art. The drivetrain 26 has a power split drive configuration in the embodiment shown in FIG. 2.

The drivetrain 26 may be configured to drive or provide torque to the first and/or second wheel sets 22, 24. In the embodiment shown, the drivetrain 26 is configured to drive the first wheel set 22 while an electrical machine 28, such as an electric motor, is configured to drive the second wheel set 24. Alternatively, the second wheel set 24 may be provided without an electrical machine 28.

The hybrid vehicle 20 may include any suitable number of power sources. In the embodiment shown in FIG. 2, the hybrid vehicle 20 includes a primary power source 30 and a secondary power source 32. The primary power source 30 may be any suitable energy generation device, such as an internal combustion engine. The secondary power source 32 may be electrical, non-electrical, or combinations thereof. An electrical power source such as a battery, a battery pack having electrically interconnected cells, a capacitor, or a fuel cell may be utilized. If a battery is used it may be of any suitable type, such as nickel-metal hydride (Ni-MH), nickel-iron (Ni—Fe), nickel-cadmium (Ni—Cd), lead acid, zinc bromide (Zu-Br), or lithium based. If a capacitor is used it may be of any suitable type, such as an ultra capacitor, super capacitor, electrochemical capacitor, or electronic double layer capacitor. A non-electrical power source may be a device whose energy may be converted to electrical or mechanical energy. For instance, a hydraulic power source or mechanical power source such as a flywheel, spring, engine, or compressed gases may store energy that may be converted or released as electrical or mechanical energy as needed. For simplicity, the description below will primarily refer to an embodiment of the present invention that incorporates an electrical power source.

The primary and secondary power sources 30, 32 may be adapted to provide power to a power transfer system 34 and/or an electrical machine 28. The power transfer system 34 may be adapted to drive one or more wheel sets 22, 24. In at least one embodiment, the power transfer system 34 may be connected to a differential 36 in any suitable manner, such as with a driveshaft, chain, or other mechanical linkage. The differential 36 may be connected to each wheel of the first wheel set 22 by one or more shafts 38, such as an axle or halfshaft.

The power transfer system 34 may include various mechanical, electrical, and/or electro-mechanical devices. In the embodiment shown, the power transfer system 34 includes a planetary gear assembly 40, a first electrical machine 42, a power transfer unit 44, and a second electrical machine 46 as primary components.

The planetary gear assembly 40 may have any suitable configuration. In the embodiment shown, the planetary gear assembly 40 includes a sun gear 50, a plurality of planet gears 52, and a ring gear 54.

The primary power source 30 may be selectively coupled to the planetary gear assembly 40 via a clutch 56. The clutch 56 may be of any suitable type, such as a one-way clutch that permits the primary power source 30 to drive the planetary gear assembly 40. If the clutch 56 is engaged, the primary power source 30 may rotate the planet gears 52. The rotation of the planet gears 52 may then rotate the ring gear 54. The ring gear 54 may be coupled to a power transfer unit 44 that is coupled to the differential 36 for transmitting torque to the vehicle wheels to propel the hybrid vehicle 20. The power transfer unit 44 may include a plurality of gear ratios that may be engaged to provide a desired vehicle response.

The first electrical machine 42, which may be a motor or motor-generator, may be coupled to the sun gear 50 to provide a torque to supplement or counteract torque provided by the primary power source 30. A brake 58 may be provided to reduce the speed and/or the transmission or torque from the first electrical machine 42 to the sun gear 50.

The secondary power source 32 and/or the first electrical machine 42 may power a second electrical machine 46. The second electrical machine 46, which may be a motor, may be coupled to a power transfer unit 44 to propel the hybrid vehicle 20.

One or more controllers 60 may monitor and control various aspects of the hybrid vehicle 20. For simplicity, a single controller 60 is shown; however, multiple controllers may be provided for monitoring and/or controlling the components, systems, and functions described herein.

The controller 60 may communicate with the primary power source 30, the secondary power source 32, and the electrical machines 42, 46 to monitor and control their operation and performance. The controller 60 may receive signals indicative of engine speed, engine torque, vehicle speed, electrical machine speed, electrical machine torque, and operational state of the secondary power source 32 in a manner known by those skilled in the art. For example, an engine speed sensor may be adapted to detect the rotational speed or rotational velocity of an associated component to detect the engine speed. Such a speed sensor may be incorporated with the primary power source 30 to detect the rotational speed or velocity of an output shaft of the primary power source. Alternatively, a speed sensor may be disposed in the drivetrain 26 downstream of the primary power source 30.

The controller 60 may receive input signals from other components or subsystems. For example, the controller 60 may receive a signal indicative of vehicle acceleration that is requested by a driver or by a vehicle system, such as an active or intelligent cruise control system. Such a signal may be provided by or based on a signal from an input device or sensor 62, such as an accelerator pedal sensor or a cruise control input device.

The controller 60 may also receive a signal indicative of vehicle deceleration that is requested by a driver or by a vehicle system, such as an active or intelligent cruise control system. Such a signal may be provided by or based on a signal from an input device or sensor 64, such as a brake pedal sensor or cruise control input device.

Acceleration and deceleration requests may be used to assess whether a "tip-in" event or a "tip-out" event has occurred. A tip-in event indicates that additional power or vehicle acceleration is demanded. A tip-out event indicates that less power or vehicle deceleration is demanded. For example, an actuation of an accelerator pedal may indicate a tip-in event. Similarly, braking of the vehicle, lifting off an accelerator pedal, or combinations thereof may indicate a tip-out event.

In a hybrid vehicle, acceleration (tip-in) and deceleration (tip-out) events may lead to a change in the power provided to actuate the wheels of the vehicle. In general, an acceleration request increases the power consumption demand and a deceleration request reduces the power consumption demand. This change in power demand may result in a transient condition or state where the operational characteristics of at least one power source are changed to provide an increased or reduced amount of power.

In a hybrid vehicle having an engine, the engine power may be a function of an engine output torque and an engine speed (e.g., power=torque*speed). During transient conditions, reduced fuel economy may occur if the engine torque and the engine speed are not intelligently controlled. Aggressive driving with more frequent tip-in and/or tip-out events may magnify fuel economy shortcomings. The disclosed vehicle and method may improve fuel economy as compared to existing methodologies by providing an enhanced method of control.

Figure 3:
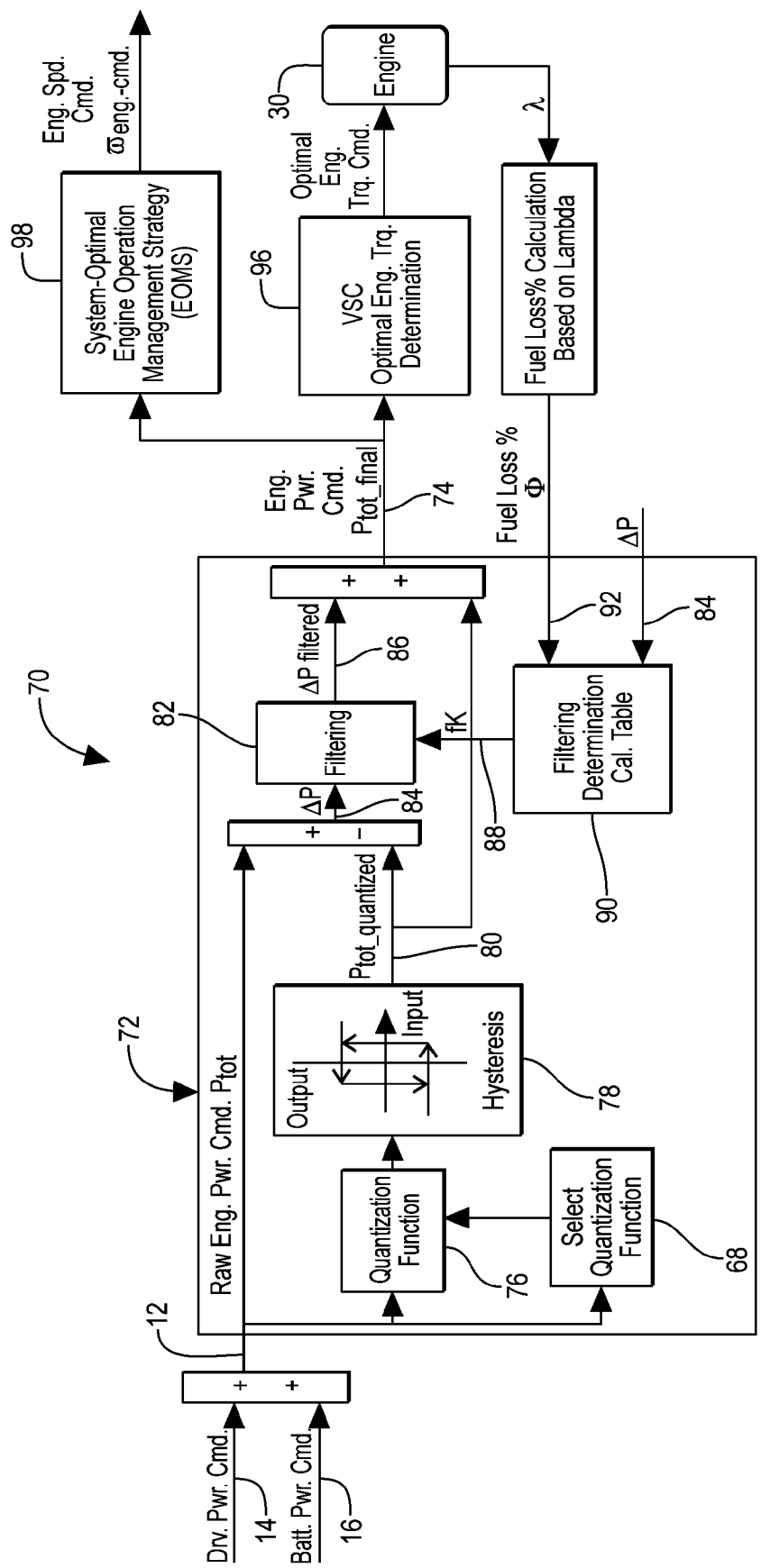
FIG. 3 illustrates a block diagram of an improved engine power determination architecture configured to implement a method of control for engine transient mitigation in a hybrid vehicle in accordance with an embodiment of the present invention.

FIG. 3 shows a block diagram of one possible embodiment of an improved engine power determination architecture 70 configured to implement a method of control for engine transient mitigation in a hybrid vehicle. The improved architecture 70 will be described with reference to an embodiment of a hybrid vehicle having an engine as a primary power source and a battery as a secondary source; however, it is to be understood that other primary and secondary power sources may be employed as described above in various embodiments.

Processes for quantizing and filtering the engine power command are included in the engine transient mitigation control method. A goal of the engine transient mitigation method is to effectively smooth out the profile of the engine power command and allow the battery to provide power to fill in the high frequency and chaotic components of the drive power.

Compared to a conventional architecture 10, the improved architecture 70 performs the following additional processes to profile the engine power command: (i) an engine power command quantization with hysteresis process (described below with reference to FIG. 4); and (ii) a quantized engine power command filtering process (described below with reference to FIG. 5).

The improved architecture 70, which may be implemented in a controller 60, includes an engine power command quantization and filtering module 72. In general, the module 72 receives a raw engine power command ($P_{tot}$) 12 as an input. The engine power command ($P_{tot}$) 12 may then be processed by the engine power command quantization with hysteresis process and the quantized engine power command filtering process. The output generated is a smoothed out engine power command ($P_{tot\_final}$) 74. In both the conventional architecture 10 and the improved architecture 70, the engine power command ($P_{tot}$) 12 is determined as the sum of a driver power command 14 and a battery power command 16. However, the improved architecture 70 outputs the smoothed-out engine power command ($P_{tot\_final}$) 74 as opposed to the engine power command ($P_{tot}$) 12 to determine an engine torque command.

The quantization and filtering module 72 includes a quantizer 76 and hysteresis logic 78. The quantizer 76 and hysteresis logic 78 generate a quantized engine power command ($P_{tot\_quantized}$) 80 output based on performing the engine power command quantization with hysteresis processes (described below with reference to FIG. 4) on the engine power command ($P_{tot}$) 12.

The quantization and filtering module 72 may also include a process 68 to select a particular quantization function 76 to be used. The quantization selection process 68 may indicate the type of quantization to be performed under different conditions. Typical quantization functions may include a ceiling function that rounds up to the closest higher quantization level, a floor function that rounds down to the closest lower quantization level, or a rounding function that rounds up or down to the closest quantization level. The selection of the particular quantization function may depend on the current operating state of the vehicle.

Figure 6:
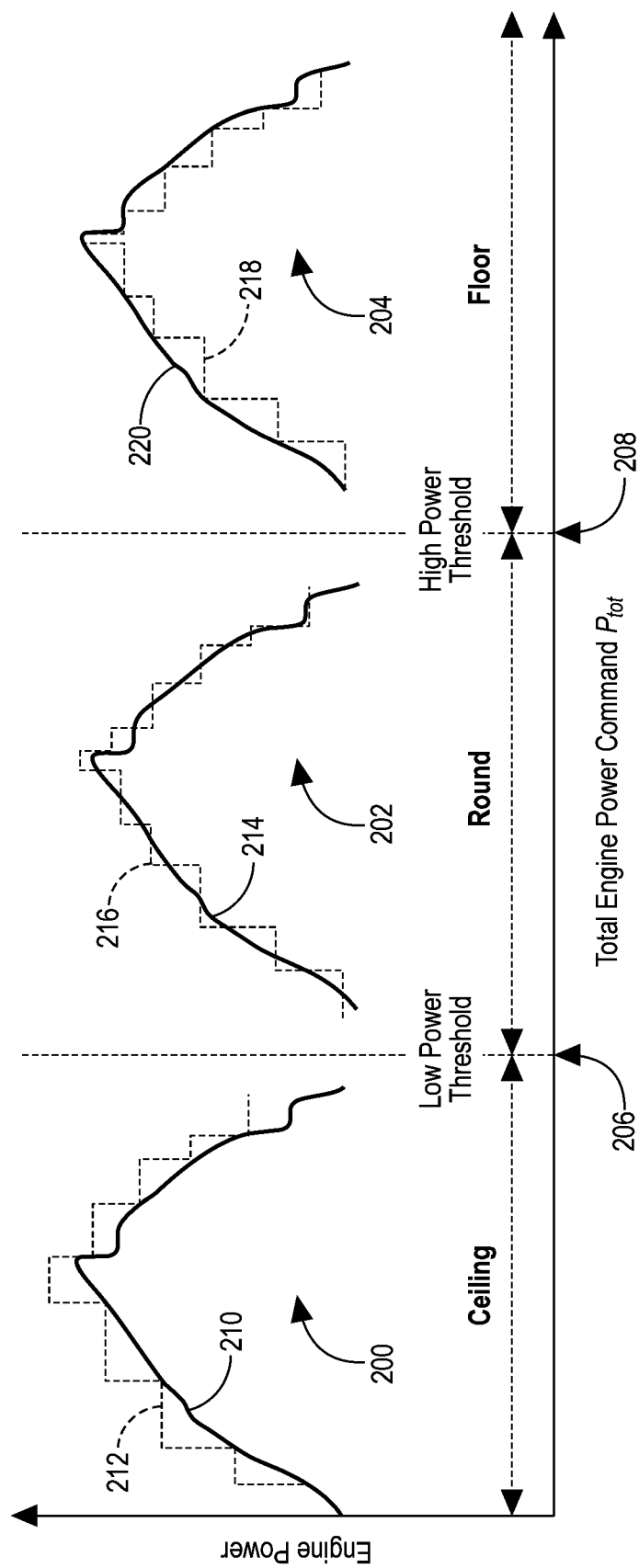
FIG. 6 illustrates a graphical representation of one possible embodiment of selecting a quantization function.

One embodiment of the quantization selection function 68 may be based on the engine power command ($P_{tot}$) 12. The engine power command 12 may reflect a total power demand for the vehicle. FIG. 6 shows one possible embodiment of the quantization selection function where the engine power range is divided into separate segments—a low power region 200, a middle power region 202, and a high power region 204. The regions may be determined using calibrateable values to define the ranges. When the engine power command 12 lies within a given region, a different quantization function may be selected. One possible configuration may be to select a ceiling function in the low power range, a rounding function in the middle power range, and a floor function in the high power range. The values defining the ranges may be calibrated to provide improvements in fuel economy and performance. Note that the embodiment described is only one possible scheme and other embodiments may be selected.

Referring to FIG. 6, a low power threshold value 206 may define a boundary between the low power region 200 and the middle power region 202. When the engine power command is below the low power threshold value 206, the engine power may be considered to be in the low power region 200. A high power threshold value 208 may also be defined that defines a boundary between the middle power region 202 and the high power region 204. An engine power command that falls between the low power threshold value 206 and the high power threshold value 208 may be considered to be in the middle power region 202. Finally, an engine power command that is above the high power threshold value 208 may be considered to be in the high power region 204.

Within each of the regions in FIG. 6, a sample total engine power command is depicted along with a corresponding quantized power command. In the low power region 200, a ceiling function is illustrated. This is shown graphically where the total engine power command 210 is quantized to the next higher quantization level as described by the quantized power signal 212. For the ceiling function, the quantized power command 212 will be at or above the total engine power command signal 210 as shown. In the middle power region 202, a rounding function is illustrated. This is shown graphically where the total engine power command 214 is rounded to the nearest quantization level as described by the quantized power signal 216. In this case, the quantized power signal 216 may be above or below the total engine power command signal 214 depending on the nearest quantization level. In the high power region 204, a floor function is illustrated. This is shown graphically where the total engine power command 220 is quantized to the next lower quantization level as described by the quantized power signal 218. For the floor function, the quantized power command 218 will be at or below the total engine power command signal 220 as shown.

For example, an embodiment having a fixed quantization step (Qntz_Step) may be described as follows:

$$Quantization_{ceiling}(P_{Tot}, Qntz\_Step) = Qntz\_Step * INT\left(\frac{P_{Tot}}{Qntz_{Step}} + 1.0\right)$$

$$Quantization_{round}(P_{Tot}, Qntz\_Step) = Qntz\_Step * INT\left(\frac{P_{Tot}}{Qntz_{Step}} + 0.5\right)$$

$$Quantization_{floor}(P_{Tot}, Qntz\_Step) = Qntz\_Step * INT\left(\frac{P_{Tot}}{Qntz\_Step}\right)$$

where INT(x) is a function that truncates to the nearest integer below the value and Qntz_Step is the size of the quantization levels. Note that other embodiments of quantization functions may be possible.

The engine power command ($P_{tot}$) 12 is the sum of the driver power command 14 and the battery power command 16 and may represent the total power demand of the vehicle. After the quantization and filtering module 72 has processed the engine power command 12, the smoothed-out engine power command ($P_{tot\_final}$) 74 may be different than the engine power command 12. In the case where the smoothed-out engine power command 74 is greater than the engine power command 12, power may be supplied to the battery as the engine may generate more power than demanded. In the case where the smoothed-out engine power command 74 is less than the engine power command 12, the battery may supply power to satisfy the deficit in the total power demand.

Now referring back to FIG. 3, the quantization and filtering module 72 may further include a filter 82. The filter 82 may perform the quantized engine power command filtering process (described below with reference to FIG. 5) by using a low pass filter to smooth out the power difference ($\Delta P$) 84 between the engine power command ($P_{tot}$) 12 and the quantized engine power command ($P_{tot\_quantized}$) 80. The filter 82 may generate a filtered power difference ($\Delta P_{filtered}$) 86 as an output. The quantized engine power command ($P_{tot\_quantized}$) 80 and the filtered power difference ($\Delta P_{filtered}$) 86 may then be summed to generate a smoothed-out engine power command ($P_{tot\_final}$) 74. The smoothed-out engine power command ($P_{tot\_final}$) 74 may be output from the quantization and filtering module 72 for use in determining an engine torque command.

The filter 82 may use a filter constant (fk) 88 supplied by a filtering determination calculation table 90 of the quantization and filtering module 72 for smoothing out the power difference ($\Delta P$) 84 to generate the filtered power difference ($\Delta P_{filtered}$) 86. As described in greater detail below, the filter constant (fk) 88 may be adaptively determined based on the amplitude of the power difference ($\Delta P$) 84 and a fuel loss % ($\phi$) 92. The fuel loss % ($\phi$) 92 may be calculated online based on the closed-loop feedback lambda ($\lambda$) A/F ratio.

Figure 4:
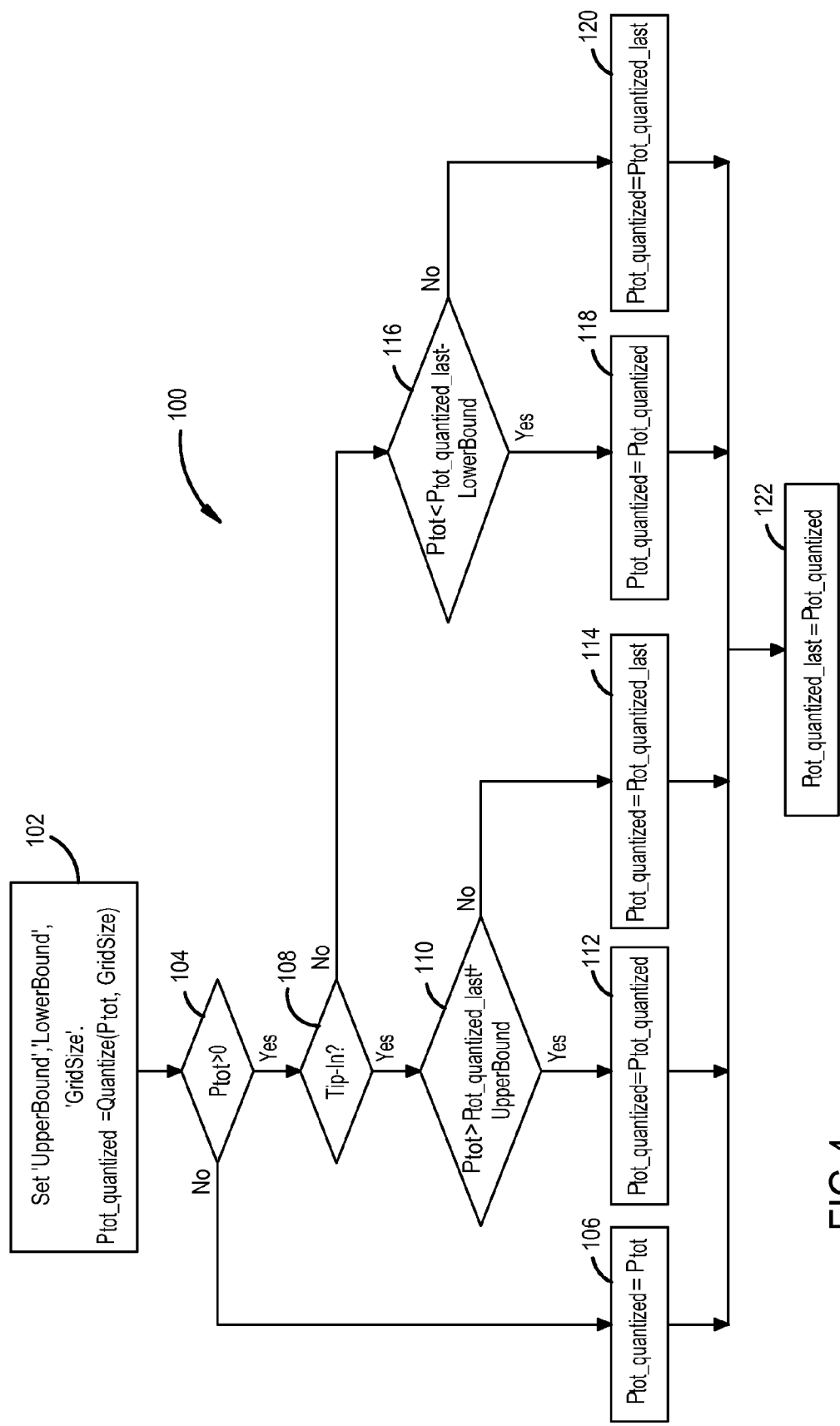
FIG. 4 illustrates a flowchart describing operation of the engine power command quantization with hysteresis process of the method of control for engine transient mitigation.
Figure 5:
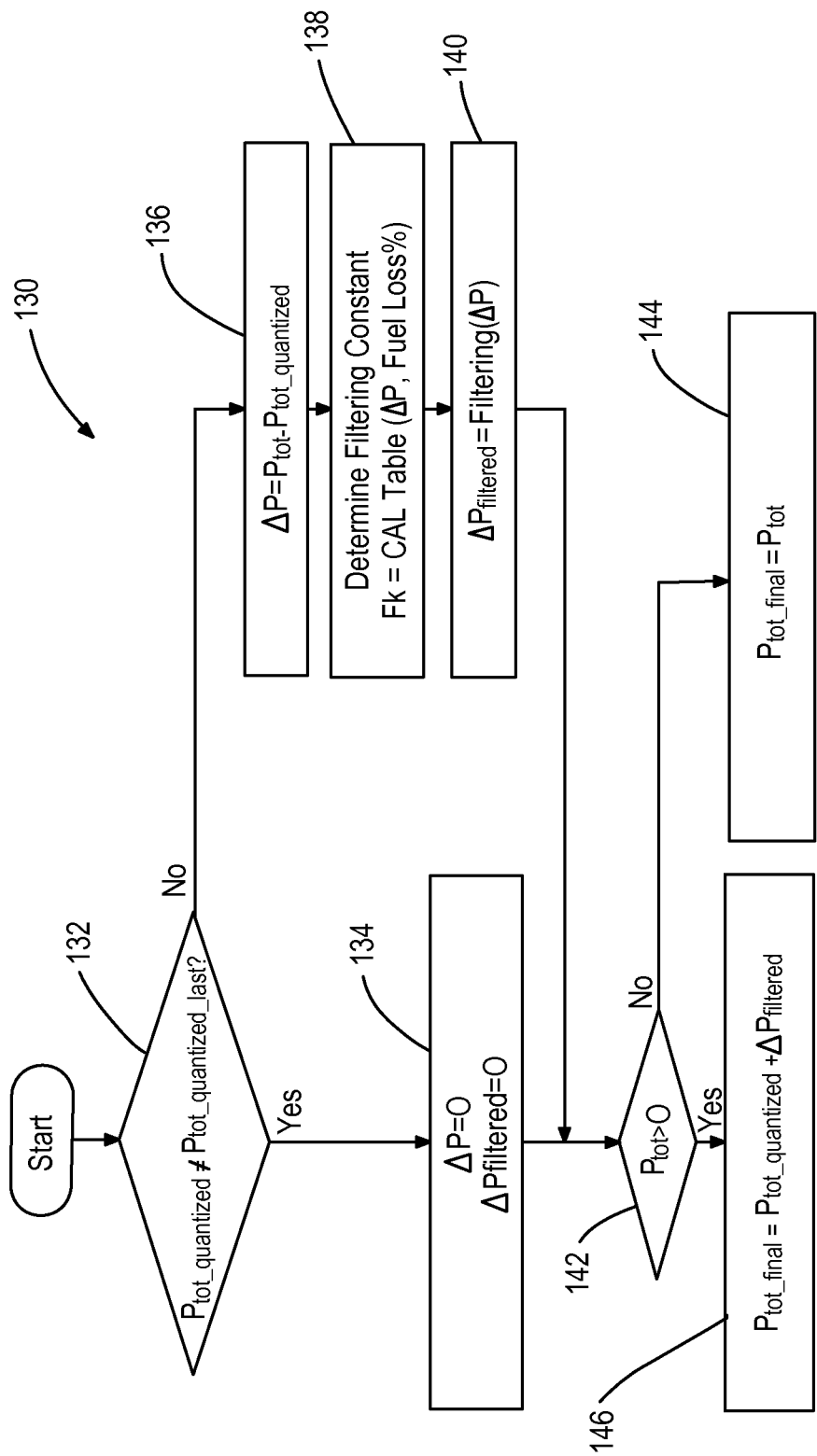
FIG. 5 illustrates a flowchart describing operation of the quantized engine power command filtering process of the method of control for engine transient mitigation.

FIGS. 4 and 5 illustrate flowcharts 100 and 130 respectively describing possible embodiments of the engine power command quantization with hysteresis process and the quantized engine power command filtering process.

As will be appreciated by one of ordinary skill in the art, flowcharts 100 and 130 represent control logic that may be implemented using hardware, software, or a combination thereof. For example, the various functions may be performed using a programmed microprocessor. The control logic may be implemented using any of a number of known programming or processing techniques or strategies and is not limited to the order of sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

The present invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Referring now to FIG. 4, with continual reference to the improved architecture 70 shown in FIG. 3, flowchart 100 describing operation of the engine power command quantization with hysteresis process is shown. The quantizer 76 and hysteresis logic 78 of the quantization and filtering module 72 perform this process.

This process provides a power quantization flow designed to discretize the raw engine power command ($P_{tot}$) 12 into predetermined (calibratable) grids. When the engine power command ($P_{tot}$) 12 fluctuates within a unit power-grid step, the engine power command is maintained at a quantized constant level to eliminate any fast changes or dithering. For example, assuming the power quantization grid step size is 5 kW, any engine command ripple with a 'change amplitude' smaller than 5 kW will be filtered out. Instead, the battery power fills in the transient demand.

Hysteresis logic is embedded to prevent the quantized engine power command from unintended fast-switching between two adjacent quantization grids. During a tip-in event, at iteration n, the quantized engine power command may be updated accordingly only if the 'amplitude increase' of the engine power command ($P_{tot}$) 12 exceeds the previous quantized engine power command (recorded from a previous iteration (n−1)) by more than an upper-bound threshold. Otherwise, the quantized engine power command remains the same as the previous iteration. Similarly, a lower-bound threshold is used in the hysteresis logic for tip-out events.

The operation of the engine power command quantization with hysteresis process begins with the value of 'UpperBound', "LowerBound', and 'GridSize' being set in block 102. The gridsize value is indicative of the step size for each quantization grid. The upper-bound value is indicative of an engine power command 'amplitude increase' threshold for tip-in events. The lower-bound value is indicative of an engine power command 'amplitude decrease' threshold for tip-out events.

Prior to quantizing, an optional step of selecting the quantization function may be performed as part of block 102. The selection of the quantization function may be a based on the engine power command ($P_{tot}$) 12. In block 102, during a current iteration 'n', the quantizer 76 quantizes the engine power command ($P_{tot}$) 12 as a function of the grid size to generate a quantized engine power command ($P_{tot\_quantized}$) for the current iteration 'n'. The quantization may be performed with the selected quantization function, which may be a floor, ceiling or rounding function.

In block 104, the engine power command ($P_{tot}$) 12 is checked to determine whether it is greater than zero. If the engine power command ($P_{tot}$) 12 is not greater than zero in block 104, then the quantized engine power command ($P_{tot\_quantized}$) 80 is set to the engine power command ($P_{tot}$) 12 (i.e., $P_{tot\_quantized} = P_{tot}$) in block 106. If the engine power command ($P_{tot}$) 12 is greater than or equal to zero in block 104, then the process continues to block 108.

Block 108 checks if there is a tip-in event. If there is a tip-in event in block 108, then the hysteresis logic 78 checks whether the engine power command ($P_{tot}$) 12 is a predetermined amount more than the previous quantized engine power command ($P_{tot\_quantized\_last}$) in block 110. This may be accomplished (block 110) by comparing the engine power command ($P_{tot}$) 12 to the sum of the previous quantized engine power command ($P_{tot\_quantized\_last}$) and the upper-bound value (i.e., $P_{tot} > P_{tot\_quantized\_last} + \text{UpperBound}$). The previous quantized engine power command ($P_{tot\_quantized\_last}$) is a value recorded by the quantizer 76 during the previous iteration 'n−1'. If the engine power command 12 is a predetermined amount more than the previous quantized engine power command, then the quantized engine power command ($P_{tot\_quantized}$) 80 is set to be the quantized engine power command ($P_{tot\_quantized}$) generated in block 102 for the current iteration 'n' (i.e., $P_{tot\_quantized} = P_{tot\_quantized}$) as shown in block 112. If the engine power command 12 is a not predetermined amount more than the previous quantized engine power command, then the quantized engine power command ($P_{tot\_quantized}$) 80 is set to be the previous quantized engine power command ($P_{tot\_quantized\_last}$) (i.e., $P_{tot\_quantized} = P_{tot\_quantized\_last}$) as shown in block 114.

If there is not a tip-in event (block 108), then there may be a tip-out event. The hysteresis logic 78 checks whether the engine power command ($P_{tot}$) 12 is a predetermined amount less than the previous quantized engine power command ($P_{tot\_quantized\_last}$). This may be accomplished (block 116) by comparing the engine power command ($P_{tot}$) 12 to the difference between the previous quantized engine power command ($P_{tot\_quantized\_last}$) and the lower-bound value (i.e., $P_{tot} < P_{tot\_quantized\_last} - \text{LowerBound}$). If the engine power command ($P_{tot}$) 12 is a predetermined amount less than the previous quantized engine power command ($P_{tot\_quantized\_last}$), then the outputted quantized engine power command ($P_{tot\_quantized}$) 80 is set to be the quantized engine power command ($P_{tot\_quantized}$) generated in block 102 for the current iteration 'n' (i.e., $P_{tot\_quantized} = P_{tot\_quantized}$) as shown in block 118. If the engine power command ($P_{tot}$) 12 is not a predetermined amount less than the previous quantized engine power command ($P_{tot\_quantized\_last}$), then the outputted quantized engine power command ($P_{tot\_quantized}$) 80 is set to be the previous quantized engine power command ($P_{tot\_quantized\_last}$) (i.e., $P_{tot\_quantized} = P_{tot\_quantized\_last}$) as shown in block 120.

The previous quantized engine power command ($P_{tot\_quantized\_last}$) is then updated 122 to be the outputted quantized engine power command ($P_{tot\_quantized}$) 80 that was determined in the current iteration (i.e., $P_{tot\_quantized\_last} = P_{tot\_quantized}$). In turn, the updated previous quantized engine power command is used for the subsequent iteration (i.e., n+1) of engine power command ($P_{tot}$) 12 at a succeeding point of time.

Referring now to FIG. 5, with continual reference to the improved architecture 70 shown in FIG. 3, flowchart 130 describing the operation of the quantized engine power command filtering process is shown. The filter 82 of the quantization and filtering module 72 performs this process.

Initially, the filter 82 has access to the outputted quantized engine power command ($P_{tot\_quantized}$) 80 and the previous quantized engine power command ($P_{tot\_quantized\_last}$). As indicated above with reference to FIG. 3, the filter 82 receives the power difference (ΔP) 84 between the engine power command ($P_{tot}$) 12 and the quantized engine power command ($P_{tot\_quantized}$) 80 (i.e., $\Delta P = P_{tot} - P_{tot\_quantized}$) as an input. The filter 82 also receives the filter constant (fk) 88 supplied by the filtering determination calculation table 90 as an input.

The operation of the quantized engine power command filtering process begins with the filter 82 checking whether the quantized engine power command ($P_{tot\_quantized}$) 80 and the previous quantized engine power command ($P_{tot\_quantized\_last}$) have a different value (i.e., $P_{tot\_quantized} \neq P_{tot\_quantized\_last}$) as shown in block 132. If the quantized engine power command ($P_{tot\_quantized}$) 80 and the previous quantized engine power command ($P_{tot\_quantized\_last}$) have a different value, then the filter 82 resets the power difference (ΔP) 84 to zero and sets a filtered power difference ($\Delta P_{filtered}$) 86 to zero (i.e., $\Delta P = 0$ and $\Delta P_{filtered} = 0$) as shown in block 134. If the quantized engine power command ($P_{tot\_quantized}$) 80 and the previous quantized engine power command ($P_{tot\_quantized\_last}$) have the same value, then the filter 82 sets the power difference (ΔP) 84 to the difference between the engine power command ($P_{tot}$) 12 and the outputted quantized engine power command ($P_{tot\_quantized}$) 80 (i.e. $\Delta P = P_{tot} - P_{tot\_quantized}$) in block 136. In block 138, the filter 82 obtains the filtering constant (fk) 88. In block 140, the power difference (ΔP) 84 obtained from block 136 as a function of the filtering constant (fk) 88 is filtered to generate a filtered power difference ($\Delta P_{filtered}$) 86.

Upon completion of block 134 or block 140, the filter 84 outputs the filtered power difference ($\Delta P_{filtered}$) 86 to a summation segment 94 of the quantization and filtering module 72. The filtered power difference ($\Delta P_{filtered}$) 86 is zero if outputted from block 134. The filtered power difference ($\Delta P_{filtered}$) 86 is the power difference (ΔP) 84 obtained from block 136 filtered as a function of the filtering constant (fk) 88 if outputted from block 140.

The process from both blocks 134 and 140 continues to block 142 where it is checked whether the engine power command ($P_{tot}$) 12 is greater than zero (i.e., $P_{tot} > 0$). If the engine power command ($P_{tot}$) 12 is not greater than zero, then the engine power command ($P_{tot\_final}$) 74, which will be outputted from the quantization and filtering module 72, is set to be the engine power command ($P_{tot}$) 12 (i.e., $P_{tot\_final} = P_{tot}$) as shown in block 144. If the engine power command ($P_{tot}$) 12 is greater than zero, then the output engine power command ($P_{tot\_final}$) 74 is set to be the sum of the quantized engine power command ($P_{tot\_quantized}$) 80 and the filtered power difference ($\Delta P_{filtered}$) 86 (i.e., $P_{tot\_final} = P_{tot\_quantized} + \Delta P_{filtered}$) as shown in block 146. Again, the summation segment 94 of the quantization and filtering module 72 sums the quantized engine power command ($P_{tot\_quantized}$) 80 and the filtered power difference ($\Delta P_{filtered}$) 86 and then outputs the engine power command ($P_{tot\_final}$) 74, which is the sum of these two variables.

As shown in FIG. 3, the quantization and filtering module 72 provides an engine power command ($P_{tot\_final}$) 74 to a Vehicle System Control (VCS) module 96 (e.g., another part of controller 60). The VCS module 96 determines an optimal engine torque command for the engine 30 based on the engine power command ($P_{tot\_final}$) 74. The Quantization and filtering module 72 may also provide the engine power command ($P_{tot\_final}$) 74 to an Engine Operation Management Strategy (EOMS) module 98 (e.g., another part of controller 60). The EOMS module 98 determines an engine speed command based on the engine power command ($P_{tot\_final}$) 74.

The design rationale of the filtering determination calculation table 90 will now be explained in greater detail. When the power difference (ΔP) is small, a fast filtering is applied. That means that a small amplitude of engine power command variation is allowed to some extent as it is less influential in triggering combustion transients. When the power difference (ΔP) is large, a slow filtering is applied so that large command fluctuations and abrupt changes are heavily smoothed open-loop to mitigate potential combustion inefficiency. On the other hand, the higher the fuel loss % ($\phi$), the slower the filtering necessary to further suppress fast transients. Such a closed-loop mechanism guarantees smooth engine power when a large enrichment A/F error is detected.

It is noted that a reset may be applied to the power difference (ΔP) 84 and the filtered power difference ($\Delta P_{filtered}$) 86 (block 134 of FIG. 5) when $P_{tot\_quantized} \neq P_{tot\_quantized\_last}$, which indicates that there is truly a desired engine power change from the driver. Therefore, the outputted engine power command ($P_{tot\_final}$) 74 may be allowed to jump to a new point on the quantized power grid.

In sum, after quantization and filtering of the inputted engine power command ($P_{tot}$) 12, the final outputted profiled engine power command ($P_{tot\_final}$) 74 is determined as the sum of the quantized engine power command ($P_{tot\_quantized}$) 80 and the filtered power difference ($\Delta P_{filtered}$) 86 (i.e., $P_{tot\_final} = P_{tot\_quantized} + \Delta P_{filtered}$).

Benefits provided by the engine transient mitigation method may include smoothing out engine operations and eliminating unnecessary engine combustion transients in open-loop to benignly mitigate A/F enrichments, using the battery to absorb driver power 'perturbations' and deal with driver power high frequency and chaotic components, and adaptively optimizing engine power between 'load-leveling' and 'load-following' to further improve fuel economy.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   a traction battery; and
   at least one controller programmed to request the engine to operate at a quantized power level that is (i) at least equal to total power demand when total power demand is less than a predetermined value, (ii) less than or equal to total power demand when total power demand is greater than another predetermined value, and (iii) closest in value to total power demand otherwise.

2. The vehicle of claim 1 wherein the traction battery receives or provides power according to the difference between the total power demand and the quantized power level.

3. The vehicle of claim 1 wherein total power demand is the sum of driver power demand and battery power demand.

4. A vehicle comprising:
   an engine;
   a traction battery; and
   at least one controller programmed to request the engine to operate at a power level selected from a plurality of quantized power levels as the quantized power level that is closest in value to a total power demand such that the traction battery receives or provides power according to the difference between the total power demand and the power level.

5. The vehicle of claim 4 wherein the at least one controller is further programmed to, in response to the total power demand being less than a predetermined value, request the engine to operate at the power level selected from the plurality of quantized power levels as the quantized power level that is closest in value to the total power demand while being at least equal to the total power demand such that the traction battery receives power from the engine.

6. The vehicle of claim 4 wherein the total power demand is the sum of driver power demand and battery power demand.

7. A method for operating an engine comprising:
   outputting power from the engine at least equal to a total power demand when the total power demand is less than a predetermined value;
   outputting power from the engine less than the total power demand when the total power demand is greater than another predetermined value; and
   requesting power from the engine at a selected one of a plurality of quantized levels closest in value to the total power demand when the total power demand is greater than the predetermined value and less than the another predetermined value.

8. The method of claim 7 wherein the total power demand is the sum of driver power demand and battery power demand.

9. The method of claim 7 further comprising requesting power from the engine at a selected one of the quantized levels closest in value to the total power demand when the total power demand is less than the predetermined value or greater than the another predetermined value.

10. The vehicle of claim 4 wherein the at least one controller is further programmed to, in response to the total power demand being greater than a predetermined value, request the engine to operate at the power level selected from the plurality of quantized power levels as the quantized power level that is closest in value to the total power demand while being less than the total power demand such that the traction battery provides power to satisfy the total power demand.

* * * * *